(12) United States Patent
Sherman

(10) Patent No.: US 9,233,464 B2
(45) Date of Patent: Jan. 12, 2016

(54) SELECTIVELY CALIBRATED WORK PIECE CUTTING GUIDE

(71) Applicant: Gary Sherman, Eagleville, PA (US)

(72) Inventor: Gary Sherman, Eagleville, PA (US)

( * ) Notice: Subject to any disclaimer, the term of this patent is extended or adjusted under 35 U.S.C. 154(b) by 86 days.

(21) Appl. No.: 14/252,878

(22) Filed: Apr. 15, 2014

(65) Prior Publication Data

US 2014/0310968 A1    Oct. 23, 2014

Related U.S. Application Data

(60) Provisional application No. 61/813,812, filed on Apr. 19, 2013.

(51) Int. Cl.
*G01B 3/10* (2006.01)
*B25H 1/00* (2006.01)

(52) U.S. Cl.
CPC ............ *B25H 1/0078* (2013.01); *G01B 3/1084* (2013.01); *G01B 2003/1089* (2013.01)

(58) Field of Classification Search
CPC .... B23Q 9/0042; B23Q 17/2233; B23Q 9/00; B23Q 9/02; B43L 13/043; B43L 7/02; G01B 2003/1089; G01B 2003/1015; G01B 2003/1046; G01B 2003/1048; G01B 2003/1074; G01B 2003/1079; G01B 3/1005; G01B 3/1041; G01B 3/1056
USPC ................................... 33/640, 760, 768, 770
See application file for complete search history.

(56) References Cited

U.S. PATENT DOCUMENTS

| | | |
|---|---|---|
| 2,571,569 A | 10/1951 | Greenwood |
| 3,192,630 A | 7/1965 | Dineson |
| 3,645,307 A | 2/1972 | Stocker |
| 3,651,574 A | 3/1972 | Burkart |
| 3,869,951 A | 3/1975 | Litwin |
| 4,016,649 A | 4/1977 | Kloster |
| 4,356,748 A | 11/1982 | Tilton |
| 4,418,902 A | 12/1983 | Genge |
| 4,483,071 A | 11/1984 | te Kolste |
| 4,557,170 A | 12/1985 | Ingham |
| 4,624,054 A | 11/1986 | Edwards |
| 4,642,898 A * | 2/1987 | Miller ...................... B25H 7/00 33/464 |

(Continued)

FOREIGN PATENT DOCUMENTS

WO    WO2006023642 A2    3/2006

OTHER PUBLICATIONS

Pro-Cut Portable Saw Guide; [retrieved on Mar. 5, 2012]. Retrieved from the internet: <URL: http://www.benchdog.com/procut.cfm>.

*Primary Examiner* — Yaritza Guadalupe-McCall
(74) *Attorney, Agent, or Firm* — Baer Crossey McDemus LLC; Kevin M. Drucker

(57) ABSTRACT

In one embodiment, an apparatus guides movement of a cutting instrument across a first surface of a work piece. The apparatus has a base, a tape-measure mount, and a fence. The base has a substantially-flat lower surface that abuts the first surface of the work piece. The tape-measure mount mounts a tape measure to the base on a first side of the apparatus. The fence is attached to the base, opposite the first side of the apparatus, and has a guiding surface that guides the movement of the cutting instrument across the first surface of the work piece. At least one movable component, other than a tape measure tape, is attached to the base to permit adjustment of a dimension of the apparatus that is used to calibrate the apparatus for use with the cutting instrument.

15 Claims, 5 Drawing Sheets

(56) References Cited

U.S. PATENT DOCUMENTS

| | | | | |
|---|---|---|---|---|
| 4,751,865 | A | 6/1988 | Buckalew | |
| 4,790,072 | A | 12/1988 | Edwards | |
| 4,890,393 | A | 1/1990 | St. Jean | |
| 4,901,444 | A | 2/1990 | Maschmeier | |
| 5,000,237 | A | 3/1991 | Berkeley et al. | |
| 5,063,802 | A | 11/1991 | Shiotani et al. | |
| 5,113,596 | A | 5/1992 | Meyers | |
| 5,271,159 | A | 12/1993 | Chen et al. | |
| 5,390,425 | A * | 2/1995 | Gilberts | B23Q 9/0042 33/474 |
| 5,406,711 | A | 4/1995 | Graham | |
| 5,472,029 | A | 12/1995 | Ketch | |
| 5,481,810 | A | 1/1996 | Hastings et al. | |
| 5,515,617 | A | 5/1996 | Canfield | |
| 5,782,007 | A * | 7/1998 | Harris | B26B 29/06 33/27.03 |
| 5,787,599 | A | 8/1998 | Clifton | |
| 5,848,481 | A | 12/1998 | Parsons et al. | |
| 6,062,122 | A | 5/2000 | Niemczyk | |
| 6,173,631 | B1 | 1/2001 | Schock | |
| 6,226,885 | B1 | 5/2001 | Korich | |
| 6,256,899 | B1 | 7/2001 | McGhee | |
| 6,393,710 | B1 | 5/2002 | Hastings | |
| 6,553,684 | B2 | 4/2003 | Jenkins et al. | |
| 6,591,509 | B2 | 7/2003 | LeBlanc | |
| 6,598,311 | B2 | 7/2003 | Noon | |
| 6,763,754 | B1 | 7/2004 | Glenn | |
| 6,868,612 | B2 | 3/2005 | Ballard | |
| 7,020,978 | B1 * | 4/2006 | Nelson | B25H 7/00 33/427 |
| 7,162,809 | B2 | 1/2007 | Haas et al. | |
| 7,165,338 | B2 | 1/2007 | Clifton | |
| 7,219,440 | B2 | 5/2007 | Lewis et al. | |
| 7,228,644 | B1 | 6/2007 | Hellem et al. | |
| 7,254,899 | B2 | 8/2007 | Marocco et al. | |
| 7,373,732 | B2 | 5/2008 | Baida | |
| 7,430,810 | B2 | 10/2008 | Sergyeyenko et al. | |
| 7,484,313 | B1 * | 2/2009 | Ogilvie | B25H 7/00 33/760 |
| 7,658,012 | B2 | 2/2010 | James et al. | |
| 7,676,950 | B2 | 3/2010 | Ogilvie | |
| 7,740,425 | B2 | 6/2010 | Zeiler et al. | |
| 7,757,592 | B2 | 7/2010 | Wilson | |
| 7,841,092 | B2 | 11/2010 | Dern | |
| 7,997,312 | B2 | 8/2011 | Van Valkenburg | |
| 8,020,312 | B1 | 9/2011 | McGahan | |
| 8,695,227 | B2 * | 4/2014 | Sherman | B25H 1/0078 33/760 |
| 2003/0037453 | A1 | 2/2003 | Mastrobattista | |
| 2006/0137202 | A1 * | 6/2006 | Clifton | B27B 27/04 33/640 |
| 2006/0196072 | A1 | 9/2006 | Lewis et al. | |
| 2007/0277389 | A1 | 12/2007 | Baida | |
| 2008/0201975 | A1 | 8/2008 | Gingerella et al. | |
| 2009/0031571 | A1 | 2/2009 | Ogilvie | |
| 2010/0224046 | A1 | 9/2010 | Osbourne | |
| 2012/0073152 | A1 | 3/2012 | McGahan | |
| 2012/0198717 | A1 * | 8/2012 | Sherman | B25H 1/0078 33/760 |
| 2014/0310968 | A1 * | 10/2014 | Sherman | B25H 1/0078 33/759 |

* cited by examiner

SELECTIVELY CALIBRATED WORK PIECE CUTTING GUIDE

CROSS-REFERENCE TO RELATED APPLICATIONS

This application claims the benefit of the filing date of U.S. provisional application No. 61/813,812, filed on Apr. 19, 2013, the teachings of all of which are incorporated herein by reference in their entirety.

The subject matter of this application is related to U.S. provisional application No. 61/439,406, filed on Feb. 4, 2011, U.S. non-provisional patent application Ser. No. 13/365,552 filed on Feb. 3, 2012, and PCT patent application no. PCT/US12/23764 filed on Feb. 3, 2012, the teachings of all of which are incorporated herein by reference in their entirety.

BACKGROUND OF THE INVENTION

1. Field of the Invention

The present invention relates to the measurement and cutting of work pieces, and, more specifically but not exclusively, to apparatuses that may be used to guide movement of a cutting instrument, such as a circular saw, across a work piece at a desired measurement from an edge of the work piece.

2. Description of the Related Art

Circular saws can be difficult and dangerous to use for a number of reasons. For example, circular saws typically include a cutting guide that requires the user to stand very close to the circular saw and to lean over the saw in order to view the cutting guide. This is because the cutting guide is conventionally located on the opposite side of the circular saw, away from the user. This further requires the user to place his or her abdomen, waist, leg and/or thigh closer to the circular saw blade, while simultaneously concentrating on keeping the cutting guide on a line that was previously drawn on the work piece, to result in a somewhat even, but not necessarily accurate, cut. As one of *Popular Mechanics* magazine's top five most dangerous tools, the circular saw's blade travels at 120 miles per hour and is a major cause of injury, especially to "do-it-yourselfers." Although professional carpenters might be more prepared to handle the hazards of using a circular saw due to their experience with the tool, even carpenters suffer from daily fatigue that increases as the long workday progresses, as well as exposure to the elements of a typical outdoor or construction-site work environment. These factors contribute to the likelihood of accidental injury from circular saw use, even among experienced users.

Circular-saw kick-up and kickback can be a dangerous problem. Kick-up occurs when the circular blade of a power saw binds or grabs a work piece being cut, which throws the spinning saw and its cutting blade up toward the user. Similarly, kickback occurs when the circular blade of a power saw binds or grabs a work piece being cut, which throws the spinning saw and its cutting blade back toward the user. Typically, the kick-up and kick-back motion occur together such that the saw is forced away from the surface of the work piece and backward toward the user. The motion of kick-ups and kickbacks can occur so quickly as to make it difficult or impossible for the user to avoid injury. Although various guides for circular saws are known, none of these guides provide protection for the user from kick-ups and kickbacks.

U.S. Pat. No. 7,020,978 to Nelson discloses an adjustable tool guide that provides no protection from circular-saw kickback. This tool guide is used in conjunction with a clamp that holds the tool guide in position over the work piece, so that the user can place both hands on the circular saw. Disadvantageously, this procedure adds an extra step that slows the cutting process, and further, the '978 patent does not specifically address the potential for harm to the user due to kick-up, kickback, or other safety concerns. In practicality, professional users seldom clamp down their smaller work piece and instead usually hold the work piece with one hand while holding the circular saw with the other. This scenario provides little protection from circular saw kick-up and kickback and increases the user's exposure to the moving blade. Further, although the tool guide of the '978 patent has an integrated tape measure with means for adjusting the effective extension length of the tape with respect to the guide, this arrangement can be unreliable because the tape adjustment assembly is pulled against the work piece each time the device is used. This pulling of the tape adjustment assembly promotes and repeatedly increases the potential for inaccuracy due to loss of calibration. To ensure accuracy in the cutting process and subsequent results, the tool guide of the '978 patent must constantly be recalibrated, e.g., by manually verifying the tape adjustment assembly using a second tape measure. Also, since most users do not own multiple circular saws, adjustability of the tool guide can be more of a detriment than a benefit, due to this constant recalibration necessitated by a number of moving parts.

U.S. Pat. No. 6,393,710 to Hastings discloses a combination tape measure and straight-edge apparatus that provides no kick-up or kickback protection from a circular saw. Unless the device is made to be extremely large, passing a circular saw adjacent to the device can be difficult. This is because the tape-measure mounting device is stationary and centrally positioned within the device, thereby providing insufficient clearance for a circular saw motor to pass by the mounted tape measure. The '710 patent provides no means for positioning the tape measure further away from the circular saw in a way that provides the necessary clearance.

U.S. Pat. No. 4,483,071 to Te Kolste also discloses a power-driven circular-saw guide that provides no kick-up or kickback protection. The device of the '071 patent includes a built-in, fully-extended measuring device or rule permanently mounted and extended to the length of the device. The size limitation of the device that is necessary to make the device portable and easy to carry limits the length of material that can be cut, making the cutting of commonly-available building material (for example, 2"×4" framing lumber in 6- to 16-foot lengths) impractical. The device also includes a wing-nut clamp that needs constant attention to ensure cutting-length accuracy.

U.S. Patent Application Pub. No. 2007/0277389 also discloses an attachable circular-saw guide that provides no kick-up or kickback protection. The device of the '389 application is an attachment to a circular saw that increases the saw's handling weight. Moreover, the '389 application discloses a device for cutting a workpiece at various angles that limits the length of material being cut, making the cutting of commonly-available building material (for example, 2"×4" framing lumber in 6- to 16-foot lengths) impractical.

SUMMARY

In one embodiment, an apparatus is configured to guide movement of a cutting instrument across a work piece. The apparatus comprises a base, a tape-measure mount, and a fence. The base has a substantially flat lower surface configured to abut a first surface of the work piece. The tape-measure mount is configured to mount a tape measure to the base on a first side of the apparatus. The fence is attached to the base, opposite the first side of the apparatus, and comprises a guiding surface configured to guide movement of the cutting instrument across the first surface of the work piece. At least one movable component attached to the base, other than a tape measure tape, permits adjustment of a dimension of the apparatus that is used to calibrate the apparatus for use with the cutting instrument.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

In the following description, it will be understood that certain embodiments of the present invention are directed to work-piece cutting guides that can be calibrated for use with differently-sized cutting instruments by adjusting a dimension of the cutting guide. Although a specific embodiment is described below as using a movable fence to adjust the calibrating dimension, embodiments of the present invention are not so limited. According to alternative embodiments of the present invention, components other than a movable fence can be used to calibrate the dimension of the cutting guide.

Figure 1:
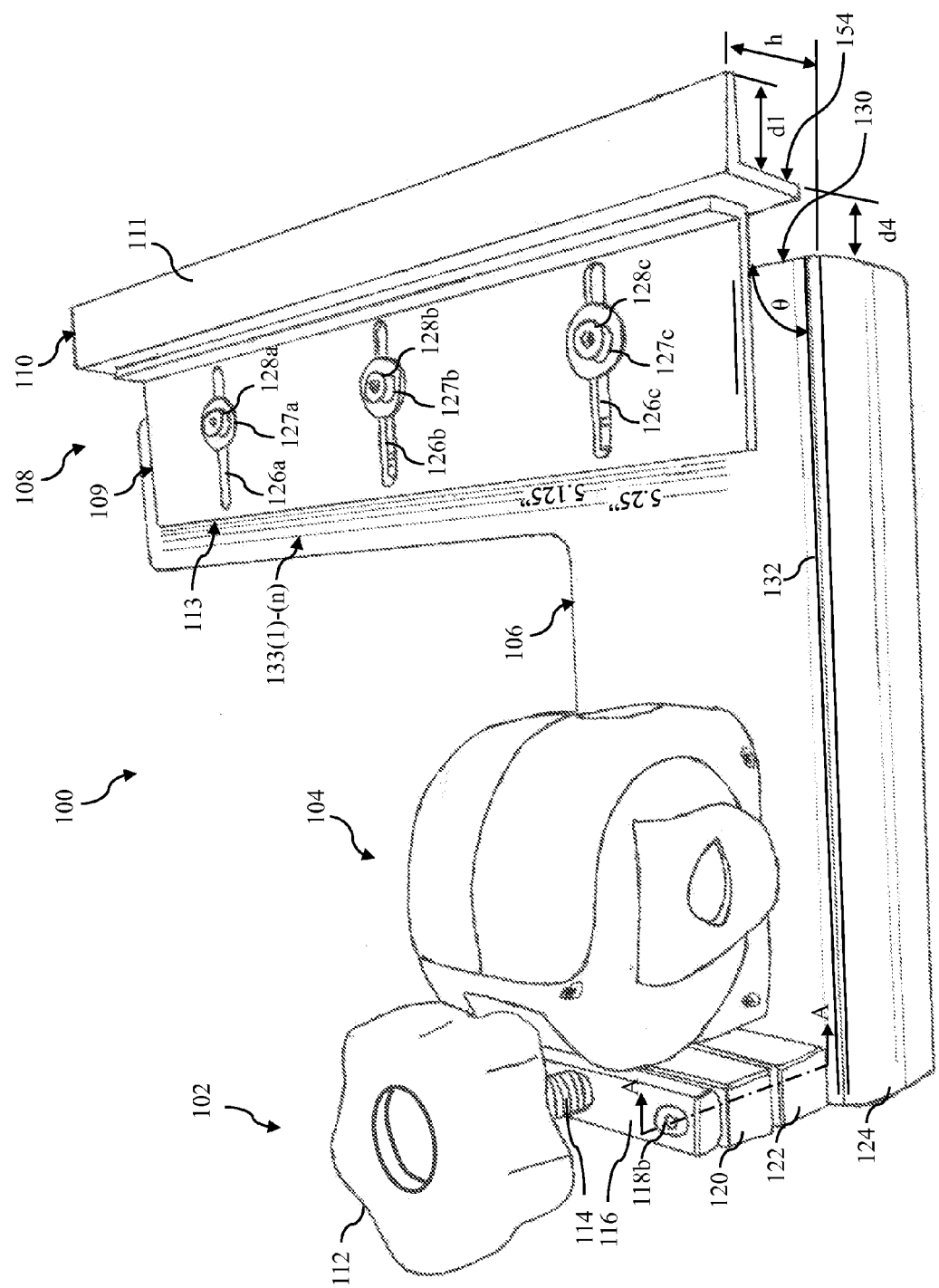
FIG. 1 shows a front perspective view of a cutting guide according to one embodiment of the present invention.
Figure 2:
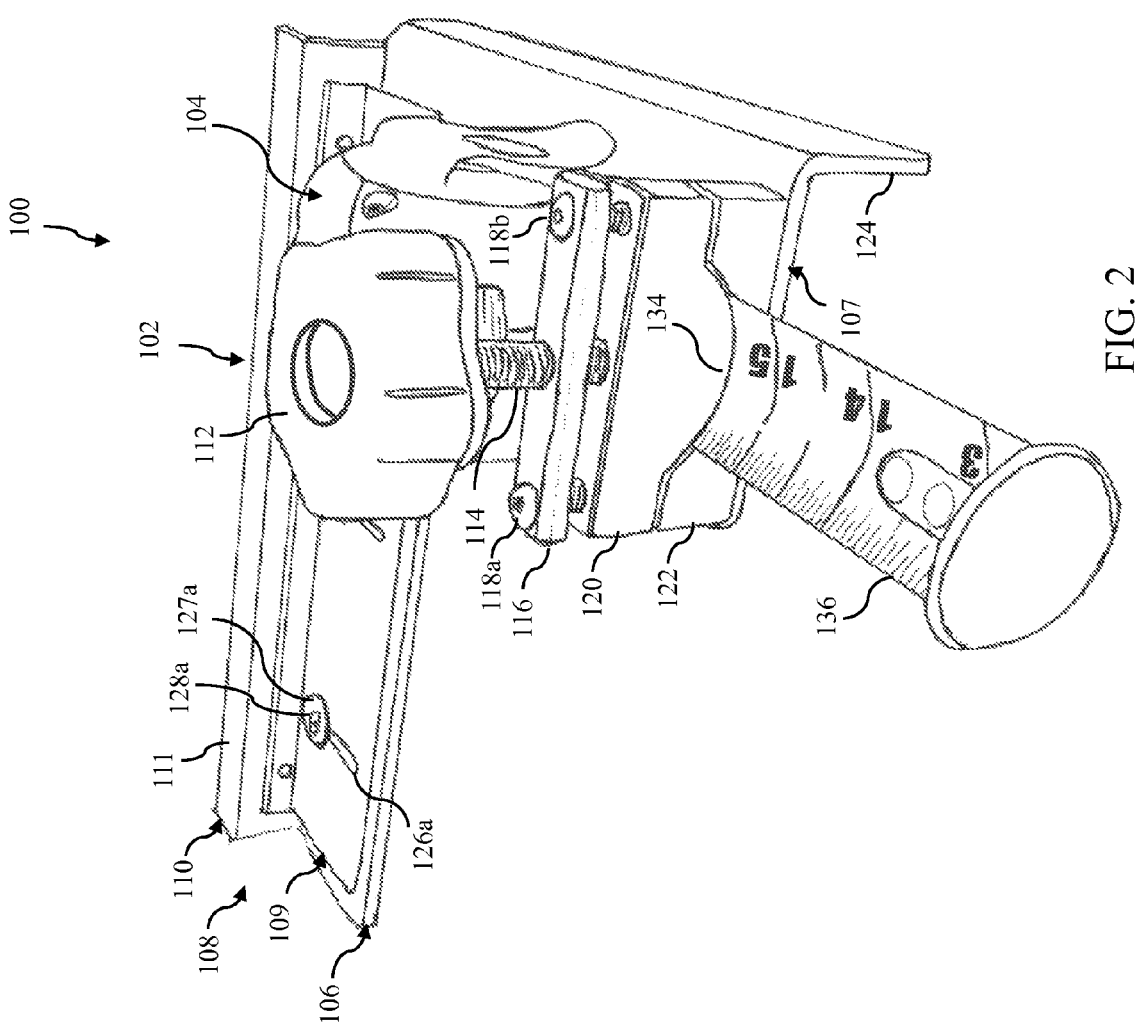
FIG. 2 shows a left-side perspective view of the cutting guide of FIG. 1.
Figure 4:
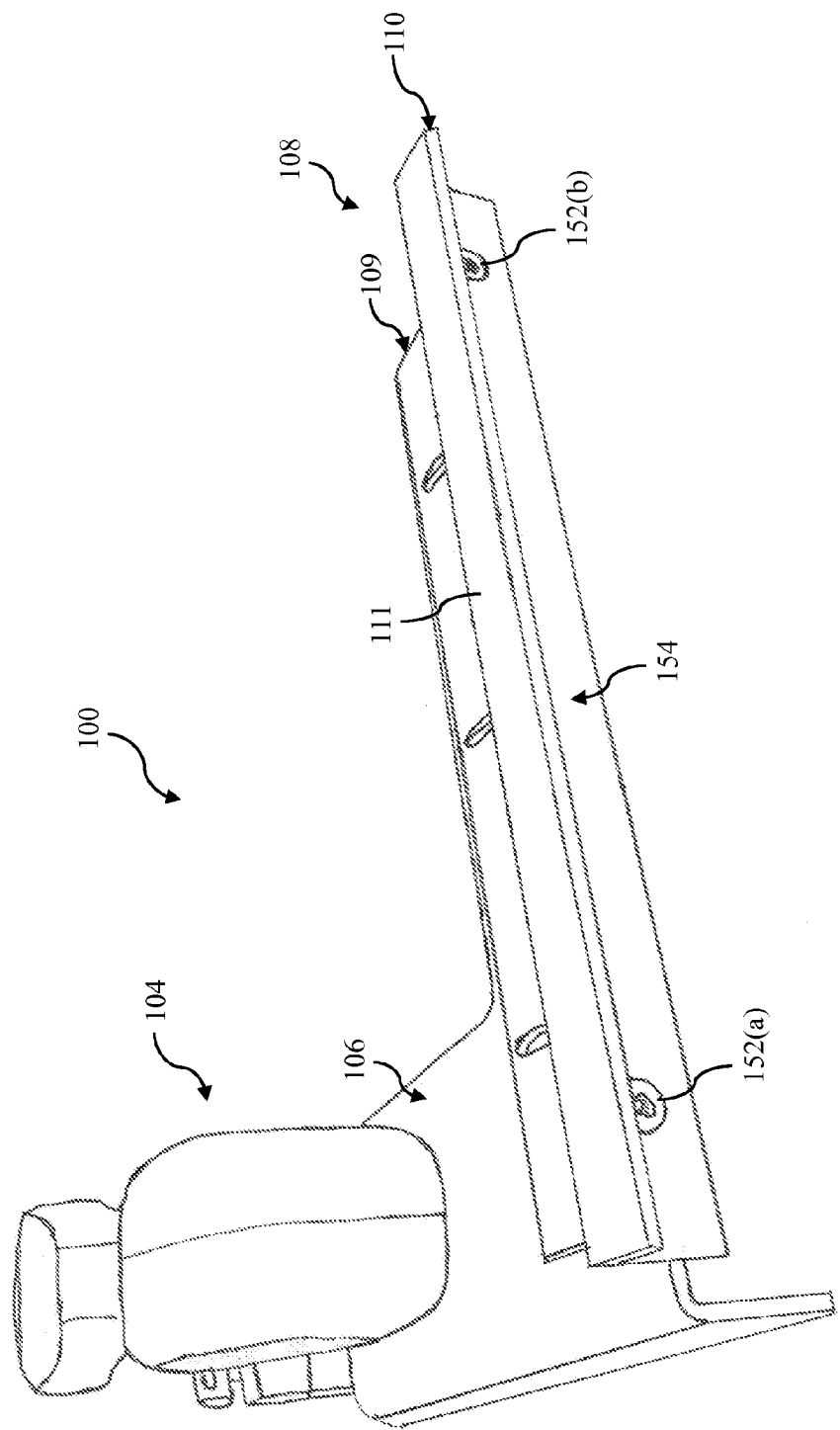
FIG. 4 shows a right-side perspective view of the cutting guide of FIGS. 1 and 2.

FIG. 1 shows a front perspective view of a cutting guide 100 according to one embodiment of the present invention, FIG. 2 shows a left-side perspective view of cutting guide 100, and FIG. 4 shows a right-side perspective view of the cutting guide 100. As described in further detail below, cutting guide 100 may be used to (i) measure a desired length of a work piece, such as a piece of wood, siding, or other suitable work piece, and (ii) guide movement of a cutting instrument such as a circular saw, jig saw, router, or other cutting instrument across the work piece at the desired length.

Cutting guide 100 includes a measurement securing assembly 102, a tape measure 104, a base 106, and a movable fence 108. Base 106, which may be constructed from a material such as metal, plastic, wood, or any other material or combination of materials suitable for holding (i) securing assembly 102, (ii) tape measure 104, and (iii) fence 108, has a substantially flat lower surface 107 (See FIG. 2) so that base 106 may be positioned flat against the cutting surface of the work piece. Base 106 also has a substantially straight front side 132 and a substantially straight right side 130, which extends from the right end of front side 132 at an angle θ. In this embodiment, angle θ is approximately 90 degrees and base 106 is a substantially L-shaped plate.

An abutment member 124, which may be used to align cutting guide 100 flat against a front surface of a work piece that is perpendicular to the cutting surface, extends across the entire length of front side 132 below lower surface 107 of base 106. In this embodiment, abutment member 124 is integral to base 106, meaning that abutment member 124 and base 106 are formed from a single piece of material by, for example, bending or machining the material to a substantially right angle.

Tape measure 104 is attached to the upper surface of base 106 such that tape 136 releases in a direction that is away from right side 130 of base 106. Tape measure 104 may be attached using any suitable method. For example, one or more holes may be formed in base 106. Tape measure 104 may then be mounted by passing screws through the one or more holes in base 106 and into the bottom of tape measure 104. To further strengthen the attachment of tape measure 104 to base 106, a plate (not shown) having tapped holes that align with the one or more holes in base 106 may be installed within tape measure 104 to receive the screws. As another example, a separate tape measure holder (not shown) may be constructed and attached to base 106. For purposes of this application, the term "tape-measure mount" refers to the mechanism used to attach tape measure 104 to base 106, such as the one or more holes formed in base 106 or the separate tape measure holder discussed above. Preferably, when tape measure 104 is mounted to base 106, tape measure 104 is not moveable relative to base 106 so that the calibration of cutting guide 100 is not lost. Calibration of cutting guide 100 is discussed in further detail below.

When tape 136 of tape measure 104 is extended to a desired distance, the position of tape 136 is secured using measurement-securing assembly 102. Measurement-securing assembly 102 is attached on the left side of the upper surface of base 106 and adjacent to the opening in tape measure 104 where tape 136 is released. To further understand the operation of measurement-securing assembly 102, consider FIGS. 2 and 3.

Figure 3:
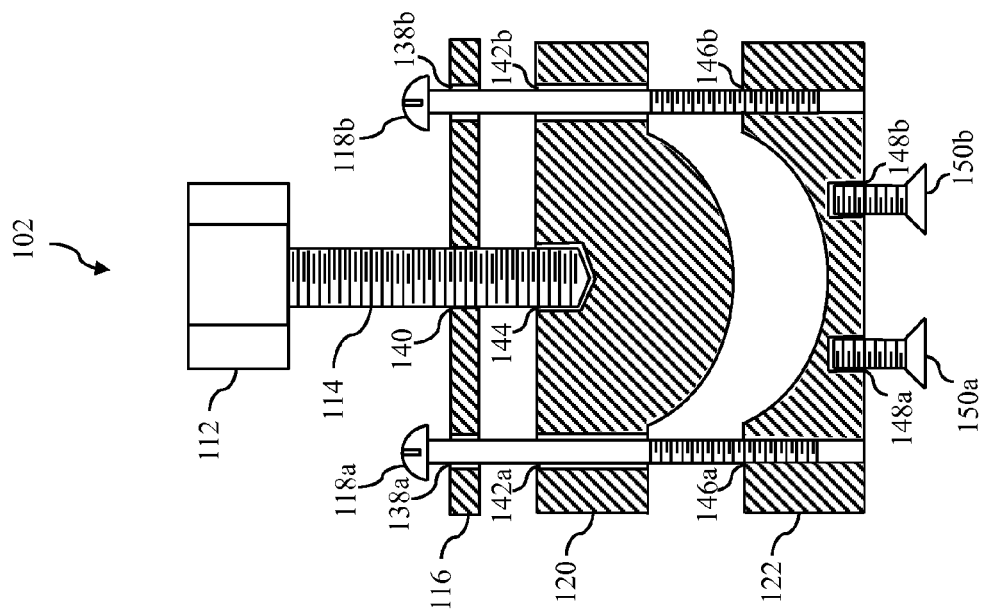
FIG. 3 shows a section view of the measurement-securing assembly in FIGS. 1 and 2 according to one embodiment of the present invention.

FIG. 3 shows a section view A-A of measurement-securing assembly 102 according to one embodiment of the present invention. Measurement-securing assembly 102 includes plate 116, an upper body 120, and a lower body 122, which may be constructed using metal, wood, plastic, or any other material or combination of materials suitable for securing tape 136. Plate 116, upper body 120, and lower body 122 are secured together using screws 118a and 118b, which prevents plate 116, upper body 120, and lower body 122 from rotating relative to one another. Screw 118a passes through (i) hole 138a in plate 116 and (ii) hole 142a in upper body 120, both of which are not tapped, and screws into hole 146a in lower body 122, which is tapped. Similarly, screw 118b passes through (i) hole 138b in plate 116 and (ii) hole 142b in upper body 120, both of which are not tapped, and screws into hole 146b in lower body 122, which is tapped. This configuration allows plate 116 and upper body 120 to slide axially relative to screws 118a and 118b between lower body 122 and the heads of screws 118a and 118b.

In addition, measurement-securing assembly 102 has a handle 112, which is fixedly attached to threaded rod 114 such that, when handle 112 is turned, threaded rod 114 turns with handle 112. Threaded rod 114 is screwed through hole 140 in plate 116, which is threaded, and the bottom of threaded rod 114 passes into hole 144 in upper body 120, which is not threaded.

Measurement-securing assembly 102 is secured to the upper surface of base 106 of cutting guide 100 by inserting screws 150a and 150b through corresponding holes in base 106 and into holes 148a and 148b of lower body 122, which are tapped, such that base 106 is trapped between the heads of screws 150a and 150b and lower body 122.

In operation, upper body 120 may be clamped down onto lower body 122, securing tape 136 between upper body 120 and lower body 122, by turning handle 112 such that threaded rod 114 screws further into hole 140 of plate 116. This in turn forces the bottom of threaded rod 114 down into hole 144 of upper body 120, forcing upper body 120 down against tape 136 and lower body 122. Preferably, lower surface 107 of upper body 120 and the upper surface of lower body 122 conform to the shape of tape 136 to prevent damage to tape 136 when securing tape 136. In this particular embodiment, upper body 120 and lower body 122 are curved to conform to tape 136, which has a curved cross-section.

As upper body 120 tightens against lower body 122, the threads of threaded rod 114 begin to apply an upward force on the threads of hole 140 in plate 116. Plate 116 is preferably designed to be strong enough that plate 116 does not bend when subject to this upward force. As a result, plate 116 applies a substantially equal and opposite force to the threads of threaded rod 114, which helps to prevent threaded rod 114 from backing out when securing a desired measurement.

Referring back to FIGS. 1, 2, and 4, fence 108 comprises two opposing and substantially L-shaped members 109 and 110. Members 109 and 110 may be constructed using metal, wood, plastic, or any other material or combination of materials suitable for guiding the cutting instrument.

The first member 109 is attached to the upper surface of base 106 on the side opposite measurement-securing assembly 102. In this embodiment, three slots 126a to 126c are formed in member 109 of fence 108. To secure fence 108 to base 106, threaded fasteners 128a to 128c are passed though slots 126a to 126c, respectively, and secured to corresponding tapped holes (not shown) formed in base 106. Further, washers 127a to 127c may be used to help sandwich fence 108 between the heads of fasteners 128a to 128c and base 106. Providing slots 126a to 126c in fence 108 enables the adjustment of a distance d4 between (i) a face 154 of fence 108, which serves as a guide against which the base of a cutting instrument may be forced along to make a cut across the work piece, and (ii) the edge 130 of the base 106. Thus, face 154 can be positioned closer to, or further away from, the edge 130 of the base 106 for calibrating cutting guide 100 to be used with different cutting instruments (such as different circular saws) as discussed in further detail below.

The second member 110 of fence 108 comprises a kick-up preventer 111. In this embodiment, second member 110 is attached to first member 109 using threaded fasteners 152(a) and 152(b) (as shown in FIG. 4). However, in other embodiments, member 110 may be attached to member 109 using, welds, rivets, or any other suitable fastening device or combination of devices, or members 109 and 110 may be fabricated from a single piece of material.

Kick-up preventer 111 hangs over the edge of fence 108 by a distance d1. Preferably, distance d1 is large enough that, when the base of a cutting instrument is forced along fence 108, kick-up preventer 111 obstructs the path of the base in the event that the base of the cutting instrument kicks straight up off of the work piece. Further, distance d1 is preferably small enough to prevent kick-up preventer 111 from interfering with portions of the cutting instrument other than the base of the cutting instrument, such as the motor or handle on a circular saw. In operation, cutting guide 100 may itself be held down onto the cutting surface with the user's hand or a clamp to prevent cutting guide 100 from kicking-up along with the cutting instrument.

Although not shown, threaded fasteners 152(a) and 152(b) may be passed through slots formed in L-shaped member 110. The slots may be similar to slots 126a to 126c and may enable a height h of kick-up preventer 111 to be adjusted. Adjusting height h enables the bases of differently-sized cutting instruments to pass underneath kick-up preventer 111. Height h should be chosen such that height h is (i) large enough to allow the base of the cutting instrument to pass between kick-up preventer 111 and the cutting surface, and (ii) not so large that kick-up preventer 111 does not prevent kick-up or interferes with a portion of the cutting instrument hanging over the fence, such as the motor on a circular saw.

Figure 5:
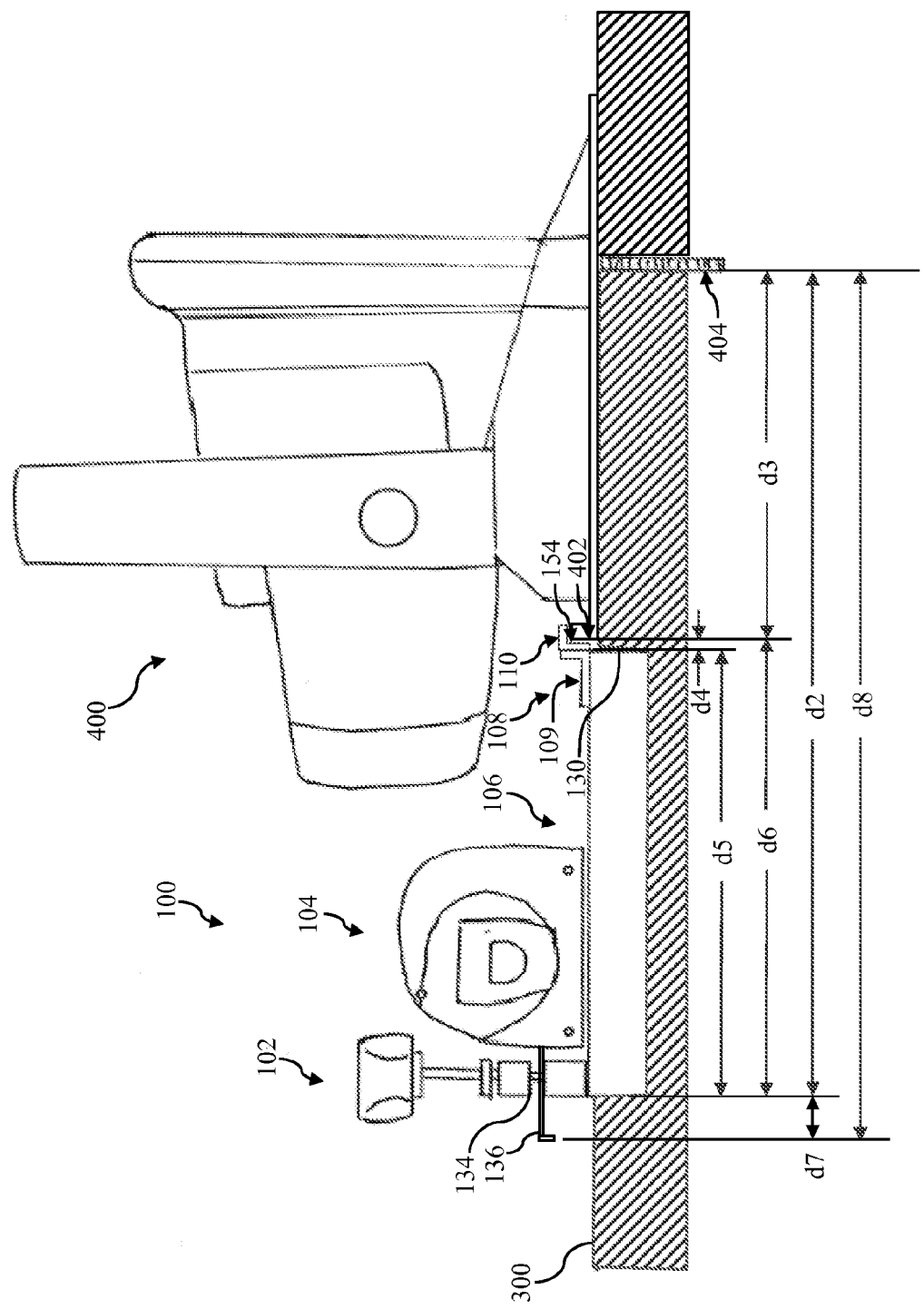
FIG. 5 shows a front view of the cutting guide of FIGS. 1, 2, and 4 installed on a work surface with a cutting instrument.

The operation of cutting guide 100 will now be discussed with reference to FIG. 5, which shows a front view of cutting guide 100 installed on work piece 300 with cutting instrument 400, which is a circular saw. In operation, the end of tape 136 is placed on one end of work piece 300. Typically, the end of a tape measure has a tab, sometimes referred to as the tang or lip, that may be used to keep the end of tape 136 positioned on the end of work piece 300. Cutting guide 100 is then pulled along work piece 300 to a desired distance d8 from the end of work piece 300, thereby unwinding tape 136 from tape measure 104. As shown in FIG. 2, curved edge 134 of measurement-securing assembly 102 serves as a sight guide for the desired measurement. Referring back to FIG. 5, cutting guide 100 is then set into position at the desired measurement by laying the bottom surface 107 of base 106 on the cutting surface of work piece 300 and aligning abutment member 124 against the front of work piece 300.

Once cutting guide 100 is positioned on work piece 300 and the desired measurement is aligned with sight guide 134, handle 112 is turned to secure tape 136 within measurement-securing assembly 102 at the desired distance. Securing tape 136 using measurement-securing assembly 102 eliminates the need to separately mark work piece 300 with a marking tool such as a pen or pencil. Note that, when turning handle 112, upper body 120 of measurement-securing assembly 102 moves axially along screws 118a and 118b and does not rotate. Since upper body 120 does not rotate, upper body 120 does not apply torque to tape 136 that could damage tape 136 or rub away the markings on tape 136. Further, since upper body 120 moves axially rather than rotating, alignment between sight guide 134 and the desired measurement on tape 136 can be maintained while handle 112 is being turned.

Note that measurement-securing assembly 102 preferably secures a desired measurement more securely than the locking mechanism on a typical tape measure. The locking mechanism on a typical tape measure usually provides some resistance to movement of the tape; however, this resistance can usually be overcome relatively easily by pulling on the tape with a hand. In addition, measurement-securing assembly 102 preferably secures tape 136 such that sight guide 134 aligns with the desired measurement. This allows for precise measurements. The locking mechanism on a tape measure, on the other hand, is typically located inside the body of the tape measure, and as a result, it is difficult, if not impossible, to use the locking mechanism on a tape measure as a sight guide. Thus, in typical prior art uses of a tape measure, the tape measure is extended beyond the desired measurement, the lock is applied to a point on the tape that exceeds the desired measurement, and then the work piece is marked at the desired measurement.

After securing the measurement, cutting guide 100 may be secured to work piece 300 by the user's hand or a clamp (not shown). Then, work piece 300 is cut by keeping the left edge 402 of the circular saw 400 held tightly against face 154 of fence 108 until the circular-saw blade passes through the entire work piece 300. While the cut is being made, the measurement on tape 136 remains visible, giving the user confidence that he or she is making the cut at the desired measurement. This is in contrast to prior art methods in which a mark is made on the work piece using a tape measure, and then the tape measure is removed. In such methods, the user might question whether or not he or she made the mark at the desired measurement.

Once measurement-securing assembly 102 secures tape 136 at the desired measurement, cutting guide 100 may be moved from one work piece to the next without disturbing the desired measurement. As a result, a plurality of work pieces can be cut at precisely the same measurement without the inaccuracies that may result from (i) separately measuring and marking each work piece and (ii) the tape measure not being sufficiently secured by the tape measure's locking mechanism. To further lock in the desired measurement, screws 118a and 118b of measurement-securing assembly 102 may be tightened.

Note that, when measuring work piece 300, tape measure 136 extends from the left side of cutting guide 100 (e.g., sight guide 134) to a distance d7 away from the cutting guide 100. However, there is a distance d2 from the left side of the cutting guide 100 (e.g., sight guide 134) to the cutting edge 404 of circular saw 400 that is not measured by tape 136 of tape measure 104 (i.e., tape 136 does not extend over distance d2). Distance d2 equals the sum of (i) distance d3, which is the distance from the left end 402 of the cutting instrument base to the cutting edge 404, and (ii) distance d6, which is a distance from the left side of cutting guide 100 to face 154 of fence 108 (i.e., d2=d3+d6). Distance d6 equals the sum of (i) distance d4, which is the distance from face 154 of fence 108 to edge 130 of base 106, and (ii) distance d5, which is the fixed width of the base 106 (i.e., d6=d4+d5).

Suppose for a moment that the measurements indicated on tape 136 begin at zero, and cutting guide 100 is pulled along work piece 300 until the marking on tape 136 corresponding to the desired distance d8 is aligned with sight guide 134. In such a case, when cutting instrument 400 is guided along face 154 of fence 108, workpiece 300 will be cut at a distance that is equal to the desired distance d8 plus the unmeasured distance d2 (i.e., d8+d2), rather than at the desired distance d8. Therefore, to ensure an accurate measurement of the desired distance d8, where d8=d2+d7, the distance d2, which tape 136 does not measure, should be taken into account. This may be accomplished by cutting the end of tape 136 so that the measurements indicated on tape 136 begin at the distance d2. In other words, the unmeasured distance d2 added by cutting device 100 and cutting instrument 400 is subtracted from tape 136 by physically removing this distance from tape 136. As a result, when the marking on tape 136 corresponding to distance d8 is aligned with sight guide 134, the cut will be made at distance d8, not at distances d8+d2.

Further complicating the above-mentioned measurement issue is the fact that distance d3 varies from one cutting instrument to the next. If distance d6 is not varied from one cutting instrument to the next, then distance d2 will also vary from one cutting instrument to the next. To enable accurate measurements for differently-sized cutting instruments, cutting guides of the present invention may be selectively calibrated for use with differently-sized cutting instruments by adjusting distance d6 to keep distance d2 constant from one cutting instrument to the next.

To support calibration, tape 136 is cut by a specified distance such that the measurements on tape 136 begin at the specified distance. The specified distance is a value to which distance d2 will be set equal during calibration and is preferably selected such that cutting guide 100 can be used for a range of differently-sized cutting instruments having different distances d3. For example, the specified distance may be selected based on an average value of distances d3 for a range of cutting instruments. Once tape 136 is cut, cutting guide 100 may be calibrated for use with a range of differently-sized cutting instruments without further cutting tape 136.

Calibration is performed each time a differently-sized cutting instrument is used with cutting guide 100 and ensures that distance d2 is equal to the specified distance identified by the first measurement of the cut tape 136. In this particular embodiment, to ensure that distance d2 is equal to the specified distance, the width d6 is adjusted by moving fence 108 (i.e., by adjusting distance d4). In particular, to calibrate cutting guide 100, (i) threaded fasteners 128a to 128c are loosened with or without being completely removed, (ii) fence 108 is moved closer to tape measure 104 to decrease distance d4 or further away from tape measure 104 to decrease distance d4 until distance d2 is equal to the specified distance, and (iii) threaded fasteners 128a to 128c are retightened to lock in the new position of fence 108. Thus, cutting guide 100 may be calibrated for cutting instruments having larger distances d3 by moving fence 108 closer to tape measure 104 (i.e., decreasing distance d4) and for cutting instruments having smaller distances d3 by moving fence 108 further from tape measure 104 (i.e., increasing distance d4).

To accommodate the calibration of cutting guide 100 for differently-sized cutting instruments, markings 133(i) (shown in FIG. 1), where i=1, . . . , n, may be provided on base 106. In this embodiment, the markings are a series of parallel lines, where each line 133(i) is marked with a different distance. The distances marked could be, for example, distances d3 for differently-sized cutting instruments. In such a case, when using markings 133(i), distance d3 is measured on the cutting instrument being used. Then, threaded fasteners 128a to 128c are loosened with or without being removed, and fence 108 is moved until the edge 113 of fence 108 is aligned with the marking 133(i) that corresponds to the distance d3 measured on the cutting instrument. Finally, fence 108 is fixed in position by tightening threaded fasteners 128a to 128c to prevent fence 108 from moving from the selected marking 133(i). This procedure may be repeated each time a differently-sized cutting instrument is used.

Although FIGS. 1-5 show an embodiment of a cutting guide 100 in which fence 108 is moved using three slots 126a to 126c and three fasteners 128a to 128c, embodiments of the present invention are not so limited. According to alternative embodiments of the present invention, cutting guides may be implemented using more than or fewer than three slots and three fasteners. Further, cutting guides may be implemented using fastening mechanisms other than slots and threaded fasteners. For example, each slot could be replaced with a series of circular holes, where each hole corresponds to a different distance d3.

Further, although FIGS. 1-5 show an embodiment of a cutting guide 100 that is calibrated by moving only fence 108, embodiments of the present invention are not so limited. According to alternative embodiments of the present invention, cutting guides may be implemented such that one or more of (i) the measurement-securing assembly (if employed), (ii) the tape measure, and (iii) the fence move to support calibration of the cutting guide. For example, in one embodiment of the present invention, measurement-securing assembly 102 and tape measure 104 may be mounted onto a plate having one or more slots similar to slots 126a to 126c in FIG. 1 using fasteners similar to fasteners 128a to 128c. Then, the assembly comprising the plate, measurement-securing assembly 102, and tape measure 104 can be moved away from or closer to fence 108 to ensure that distance d2 is equal to the specified distance.

Although an embodiment of the present invention was described as having a base that is an L-shaped plate, the present invention is not so limited. According to alternative embodiments of the present invention, the base may be rectangular, square, triangular, irregular, or any other suitable shape. Also, in alternative embodiments, the base might not have a plate-like shape.

Further, although an embodiment of the present was described as having an abutment member 124, a measurement securing assembly 102 separate from tape measure 104, and a kick-up preventer 111, embodiments of the present are not so limited. Alternative embodiments of the present invention are possible that do not employ one or more of (i) abutment members, (ii) measurement securing assemblies separate from tape measures, and (iii) kick-up preventers. In embodiments that do not employ measurement securing assemblies separate from tape measures, the locking mechanisms of the tape measures serve as measurement securing assemblies.

Yet further, although an embodiment of the present invention was described in which an angle θ between fence 108 and front side 132 is fixed at 90 degrees, the present invention is not so limited. For example, according to alternative embodiments, angle θ may be fixed at less than or greater than 90 degrees. Further, according to alternative embodiments, angle θ may be adjustable by, for example, moving the fence. U.S. Pat. Nos. 4,901,444 and 5,787,599, the teachings of all of which are incorporated herein by reference in their entirety, provide examples of adjustable-angle fences that may be adapted for use with the present invention.

Yet still further, although an embodiment of the present invention was described as having an abutment member 124 that is formed by bending base 106, the present invention is not so limited. According to alternative embodiments of the present invention, abutment member 124 may be formed as a separate component that is fixedly or removeably attached to base 106 using screws, welds, or any other suitable fastening device.

According to alternative embodiments of the present invention, securing devices other than measurement-securing assembly 102 may be used to secure tape 136 at a desired measurement. For example, a spring-loaded clamp may be used that secures tape 136 when the user releases the clamp.

Further, according to alternative embodiments of the present invention, measurement-securing assembly 102 might not have lower body 122, and upper body 120 could secure tape 136 against base 106.

Yet further, according to alternative embodiments of the present invention, markings 133(i) other than the lines and numbering shown in FIG. 1 may be used for calibrating cutting guide 100.

Alternative embodiments of the present invention may be envisioned where the tape measure tape is not cut, and the measurements on the tape begin at zero. In such embodiments, the user may (i) subtract the distance d2 from the desired distance d8 and (ii) extend the tape to the resulting difference to achieve the total desired distance d8 (i.e., d8=d7+d2). This subtraction step would be performed each time a new desired distance d8 is selected.

Various embodiments of the present invention may also employ a kick-back preventer and a kick-back preventer bar as discussed in U.S. non-provisional patent application Ser. No. 13/365,552.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims. For example, various components of cutting guide 100 such as fence 108 and measurement-securing assembly 102 may be assembled using fasteners other than screws, including but not limited to welds.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

What is claimed is:

1. An apparatus configured to guide movement of a cutting instrument across a first surface of a work piece, the apparatus comprising:
    a base having a substantially flat lower surface configured to abut the first surface of the work piece;
    a tape-measure mount configured to mount a tape measure to the base on a first side of the apparatus; and
    a fence attached to the base, opposite the first side, the fence comprising a guiding surface configured to guide the movement of the cutting instrument across the first surface of the work piece, wherein at least one movable component attached to the base, other than a tape measure tape, permits adjustment of a dimension of the apparatus that is used to calibrate the apparatus for use with the cutting instrument.

2. The apparatus of claim 1, wherein the dimension is measured between the first side of the apparatus and the guiding surface of the fence.

3. The apparatus of claim 1, wherein the at least one movable component comprises the fence.

4. The apparatus of claim 3, wherein the fence is configured to slide on an upper surface of the base.

5. The apparatus of claim 4, wherein the fence has one or more slots formed therein, the one or more slots configured to permit sliding movement of the fence on the base.

6. The apparatus of claim 3, wherein the base comprises one or more markings thereon configured for positioning of the fence.

7. The apparatus of claim 6, wherein the one or more markings comprise one or more numerical dimensions.

8. The apparatus of claim 7, wherein the one or more numerical dimensions correspond to one or more dimensions of one or more differently-sized cutting instruments.

9. The apparatus of claim 8, wherein each of the one or more dimensions is a distance between (i) a cutting edge of a different one of the cutting instruments and (ii) an edge of the different one of the cutting instruments that is guided against the guiding surface of the fence.

10. The apparatus of claim 6, wherein the fence is movable to selectively align a side of the fence with the one or more markings.

11. The apparatus of claim 1, further comprising the tape measure mounted to the tape-measure mount such that the tape extends away from the fence.

12. The apparatus of claim 11, wherein a tape of the tape measure is cut to support calibration of the apparatus such that the tape does not begin at zero.

13. The invention of claim 1, further comprising a measurement-securing assembly attached to the base, opposite the fence, wherein:
- the measurement-securing assembly is adapted to secure a tape of the tape measure to the apparatus when the tape is extended to the desired measurement; and
- the dimension is measured between an edge of the measurement securing assembly and the guiding surface of the fence.

14. The invention of claim 13, wherein the measurement-securing assembly is separate from the tape measure.

15. The invention of claim 1, wherein:
- the at least one movable component comprises the fence;
- the apparatus comprises a measurement-securing assembly adapted to secure a tape of the tape measure to the apparatus when the tape is extended to the desired measurement; and
- the fence is movable to adjust the dimension, wherein the dimension is measured between and edge of the measurement securing assembly and the guiding surface of the fence.

* * * * *